May 19, 1970     R. D. GREEN     3,512,825
AERODYNAMIC WING FOR RACING CARS
Filed June 11, 1968     2 Sheets-Sheet 1

INVENTOR
ROBERT D. GREEN

BY Polachek & Saulsbury
ATTORNEYS.

May 19, 1970   R. D. GREEN   3,512,825
AERODYNAMIC WING FOR RACING CARS
Filed June 11, 1968   2 Sheets-Sheet 2
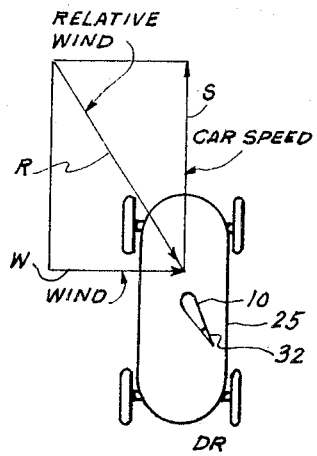
Fig. 7A.
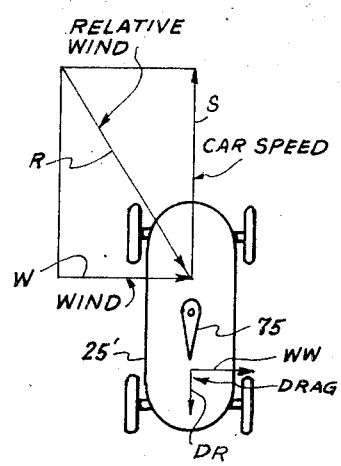
Fig. 7B.
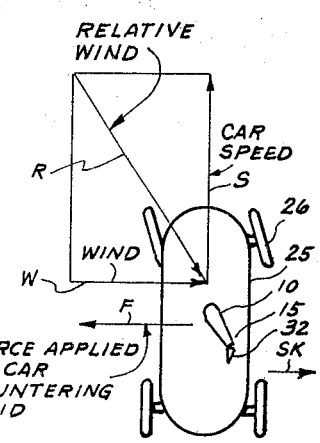
Fig. 8A.
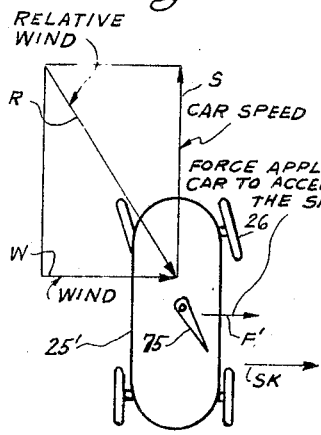
Fig. 8B.
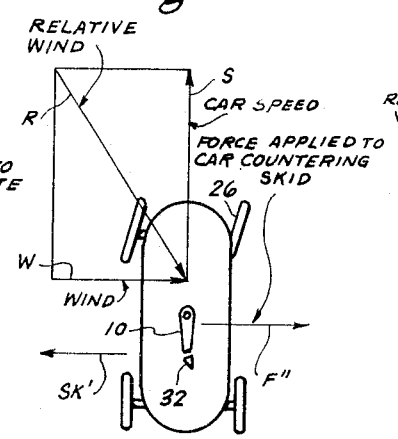
Fig. 9A.
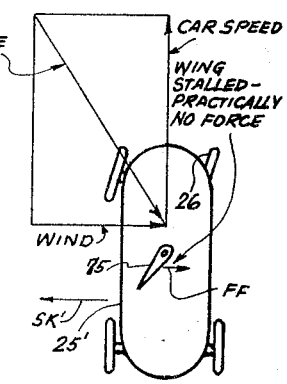
Fig. 9B.
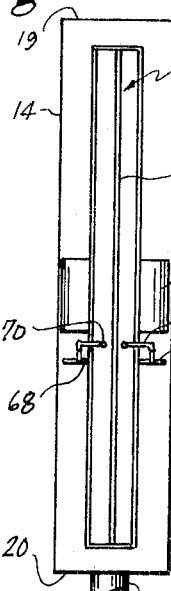
Fig. 6.
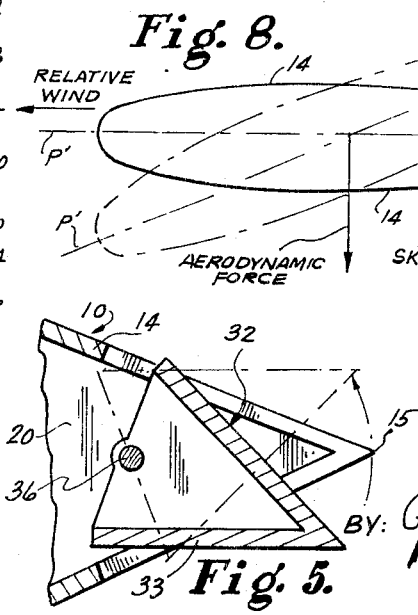
Fig. 8.
Fig. 5.
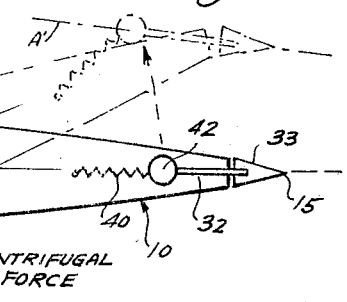
INVENTOR
ROBERT D. GREEN
BY: Polachek & Saulsbury
ATTORNEYS.

United States Patent Office 3,512,825
Patented May 19, 1970

3,512,825
AERODYNAMIC WING FOR RACING CARS
Robert D. Green, c/o Ethiopian Air Lines, Box 1755, Addis Ababa, Ethiopia
Filed June 11, 1968, Ser. No. 736,154
Int. Cl. B62d 1/89
U.S. Cl. 296—1                                9 Claims

ABSTRACT OF THE DISCLOSURE

An aerodynamic wing is turnably mounted on a racing car to produce a substantial centripetal aerodynamic force to counteract centrifugal force encountered while the car is turning to enable the car to maintain high speed while turning. The device operates fully automatically without any direct coupling to steering gear, engine or wheels, and without supplementary driving mechanical or hydraulic control means. The wing is self-centering and streamlines into the relative wind on straightaway driving to minimize drag. The wing has a pivotable rear control tab turned by a laterally movable mass responsive to lateral centrifugal force.

---

The invention relates to anti-skid devices for racing cars and more specifically to an aerodynamic wing which operates fully automatically to counteract lateral centrifugal force countered on turns.

It has been proposed heretofore to provide a vehicle with a movable fin to counteract skidding. It has been either coupled to the steering linkage so as to adjust its position proportional to the angle at which the steering wheel is turned, or else it has been controlled directly by the driver. The relationship between the side force and the angle of the steering wheel depends on the speed of the vehicle and on whether the vehicle is skidding. Coupling the fin to the steering gear so that the fin's position depends only on the steering wheel angle does not work well. Direct control by the driver is also objectionable since it requires attention that the driver may not be able to give, and because the driver may misjudge the extent to which the fin must be turned.

It has also been proposed to provide an anti-skid vane such as described in U.S. Pat. No. 3,326,318. The vane is controlled by a mechanical or hydraulic system responsive to a side force existing between the wheels of a vehicle and the ground. Such anti-skid vane does not take into account and is not responsive to lateral or side wind, so that the vane can be stalled or become completely ineffective if a side wind blows in the same direction as the direction in which the vehicle turns.

The present invention is directed at overcoming the above and other difficulties by providing an axially vertical wing which turns aerodynamically without auxiliary mechanical or hydraulic means. The wing is turned exactly the right amount angularly into the relative wind to generate the correct centripetal force even in a direct crosswind. A mechanically turned anti-skid vane by contrast might not turn the vane enough under such a condition to produce any force to counteract a skid, and it could be so far out of position that it might produce a lateral force to start or even accelerate a skid. The aerodynamic wing of the present invention will line up at all times with the relative wind while the car carrying it is going straight ahead. The wing has a laterally movable mass which is coupled to a rear control tab hinged to the wing. In a turn either to the right or left, the wing will turn itself an amount proportional to the amount of outward centrifugal force applied to the weight to turn the control tab. The result will be to produce an anti-skid force regardless of the direction of the wind to the right or left.

The invention will be explained in further detail in connection with the drawings, wherein:

FIG. 5 is a further enlarged fragmentary sectional view taken on line 5—5 of FIG. 3.

FIG. 6 is a rear elevational view of the wing.

FIG. 7A and FIG. 7B are diagrams used in explaining the invention, with FIG. 7A representing operation of the aerodynamic wing on a car moving straight ahead while subjected to a crosswind, and with FIG. 7B representing a car under the same conditions with a conventional rotatable fin or vane.

FIG. 8 is a diagrammatic plan view illustrating action of the aerodynamic wing while the car carrying it is turning in a crosswind.

FIG. 8A is a diagram employed to explain operation of the wing while the car is turning to the left in a crosswind.

FIG. 8B is a diagram employed to show how a car carrying a conventional rotatable fin or vane will behave while turning to the left in a crosswind.

FIG. 9A is a diagram employed to explain operation of the wing while the car is turning to the right in a crosswind.

FIG. 9B is a diagram employed to show how a car carrying a conventional rotatable fin or vane will behave while turning to the right in a crosswind.

Figure 2:
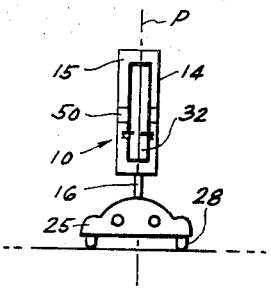
FIG. 2 is a rear view of the car and wing of FIG. 1.
Figure 1:
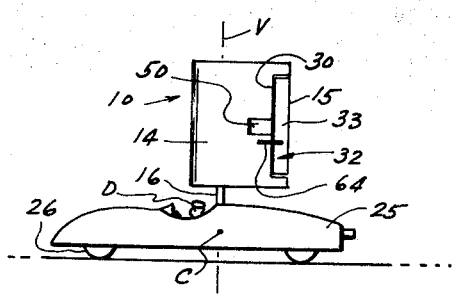
FIG. 1 is a side view of a racing car equipped with an aerodynamic wing embodying the invention.
Figure 4:
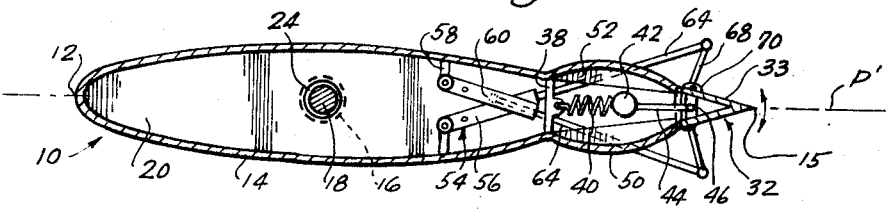
FIG. 4 is a horizontal cross sectional view taken on line 4—4 of FIG. 3.
Figure 3:
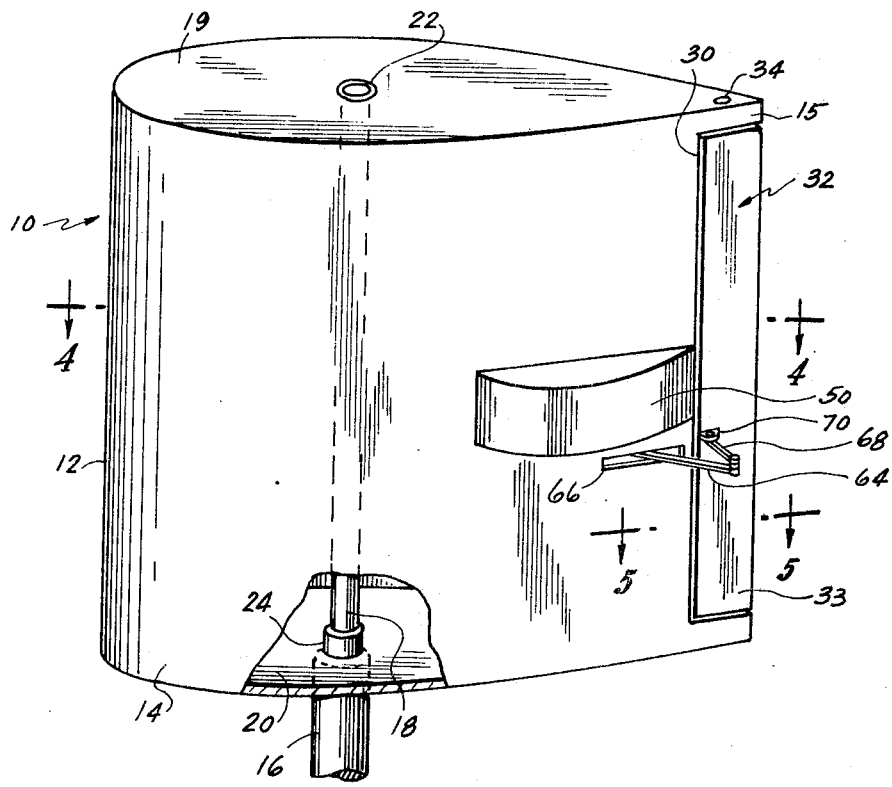
FIG. 3 is a perspective view of the wing on an enlarged scale.

Referring now to the drawings, there is shown in FIGS. 1 through 6 and in FIG. 8, a streamlined hollow wing 10 having a rounded forward leading end 12, faired vertical side walls 14 and tapered narrowed rear or trailing end 15. The wing is carried by an axially vertical shaft 16. An extension 18 of the shaft passes through upper and lower horizontal walls 19, 20 of the wing. Sleeve bearings 22, 24 can be provided to permit the wing to turn freely on a vertical axis. The axis of rotation V of the wing and shaft is at or close to the central gravity of the wings. The wing is supported by the shaft 16 above the center of gravity C of a racing car 25. Thus the wing can turn freely to the right or left. Front wheels 26 of the car are under control of drive D. Rear wheels 28 are disposed in parallel vertical planes parallel to the vertical central plane of symmetry P of the car.

A cutout 30 is formed at the trailing end of the wing, in which is set a turnable tab 32. The tab is triangular or V-shaped in horizontal section as clearly shown in FIGS. 4 and 5. It has vertical rectangular side walls 33. The tab turns on upper and lower pins 34, 36 engaged in trailing end portions of upper and lower walls 19, 20 of the wing. A cross bar 38 is secured in the wing forwardly of the tab midway between the top and bottom of the wing. Attached to this bar is the forward end of a coil spring 40. Attached to the rear of the spring is a massive body 42 which can be a lead ball or other heavy weight. A rod or link 44 extends rearwardly from the body 42 and is attached to cross bars 46 which extend inwardly from side walls 33 of the tab midway between its top and bottom. A pair of faired projections 50 are formed in the side walls 14 of the wing to define cavities 52 into which the body 42 can swing either to the right or left of the vertical plane of symmetry P′ of the wing. When the body 42 swings to the right looking from rear to front of the wing the tab will swing to the left and vice-versa.

Damping devices 54 can be provided to prevent the tab from oscillating freely or rapidly. Two damping devices 54 are shown, but one dampening device may be sufficient. Each damping device includes a horizontal air cylinder 56 pivotally attached at its forward end to a bracket 58 inside one wall of the wing. A piston 60 in the cylinder moves against air pressure in the cylinder. A shaft 64 extends axially rearwardly of the cylinder through a slot 66 in a side wall 14, of the wing. A link 68 is pivotally attached between the rear end of shaft 64 and a pivot joint 70 at the rear edge of side wall 33 of the tab. FIG. 5 illustrates how the tab 32 can swing to the right or left around a vertical axis passing through a pin 36 near the rear vertical plane of the tab.

FIGS. 1–4, 6 and 8 show that the central vertical plane of the tab 32 aligns in a streamlined position with the central vertical plane P' of the wing when the car 25 moves straight ahead so that drag is minimized. The body 42 is centered between walls 52 of the wing. The spring 40 is effective to hold the tab 32 in this centered position so there is no tendency for the tab to turn either to the right or left.

FIG. 7A shows the effect on wing 10 carried by car 25 when driving straight ahead while a crosswind is blowing. The forward speed force vector S is shown directed on the straightaway course. Force vector W indicates the laterally directed force of wind directed to the right. The relative wind force vector R is the resultant of force vectors S and W. The wing 10 turns in the direction of the resultant force vector R so no resultant drag occurs. The rear tab 32 remains aligned with the wing in streamlined position.

FIG. 7B shows by contrast with FIG. 7A the effect when a car 25' equipped with a rotatable vane 75 without a rear turnable tab is operated on a straightaway course in a crosswind, under force conditions the same as before. Since the vane 75 does not respond to the crosswind force W, it stays in straight ahead position. Force DR constitutes a drag which is undesirable since it reduces speed. Cross force WW is also undesirable since it causes side sway.

FIGS. 5, 8 and 8A show the operation of wing 10 when the car 25 turns left. Wheels 26 are shown turned to the left in FIG. 8A. The massive body 42 shown dotted in FIG. 8 moves to the right due to centrifugal action and turns tab 32 to the left. Crosswind pressure indicated by vector W in FIG. 8A impinges on the tab and thus turns the trailing edge 15 of the wing to the right. This gives an angle of attack to the wing, and aerodynamically generated centripetal force indicated by vector F opposes the centrifugal skid force SK of the turning car. Vector S indicates the car speed, and relative wind is indicated by vector R.

FIG. 8B indicates what will happen when a car 25' equipped with a rotatable vane or fin 75 without a relatively turnable tab is employed under the same driving conditions. The force vectors W, R and S are the same as in FIG. 8A. A force indicated by vector F' is generated which is actually in the same direction as skid force SK so that the crosswind force W is actually accelerating the skid.

FIG. 9A shows the operation of wing 10 when the car 25 turns right. The crosswind and other vectors W, R and S are the same as in FIG. 8A. Now the massive body 42 will swing to the left, turning tab 32 to the right. The wing itself is oriented in the direction of vector S. A force F'' is generated directed to the right which counters the centrifugal force SK' to minimize the skid.

FIG. 9B shows the effect when car 25' equipped with vane 75 without a turnable tab is turned to the right. Force vectors W, R and S are as in FIG. 8A. The vane stalls since it is not responsive to wind directions. Only a very small force FF is generated which has neglible effect in countering skid force SK'.

It will be apparent from the foregoing, that a racing car equipped with a wing having a trailing turnable tab will be increased in overall speed around a course. The wing operates automatically so that heavy operating mechanisms can be avoided. The wing itself can be made of strong lightweight material like aircraft wing structures.

As one example of the effects obtained, suppose wing 10 is four feet wide and five feet high. On a fifty mile per hour curve, a push or pull of about 15 to 20 pounds per square foot could be realized. Thus the wing would create 300 to 400 pounds of lateral force to counteract the centrifugal force of the turn. Since some racing cars only weigh about 1200 pounds, the lateral force created by the wing can approximate the centrifugal force in magnitude. At higher curve speeds, such as 100 miles per hour, the lateral force created by the wing would be four times as large as as at 50 miles per hour.

The tab 32 can be pivotally mounted in various ways of which only the simple way is shown in the drawings. The mass 42 can be differently shaped and mounted in various ways other than illustrated for turning the tab; and the spring 40 which stabilizes the body 42 can also have different forms and locations.

While I have illustrated and described the preferred embodiments of my invention it is to be understood that I do not limit myself to the precise construction herein disclosed and that various changes and modifications may be made within the scope of the invention as defined in the appended claims.

What is claimed is:

1. An aerodynamic wing structure for stabilizing a high speed surface vehicle, comprising an axially vertical wing having a symmetrical structure with respect to a central vertical plane thereof, said wing having a vertical leading end and vertical trailing end; shaft means mountable on the vehicle and rotatably supporting the wing to rotate on its vertical axis; a tab turnably mounted at and defining the trailing end of the wing, said tab being turnable laterally on a vertical axis, on both sides out of the central vertical plane of the wing; a movable massive body disposed in the vertical plane of the wing and connected to the tab to turn the same when the body moves laterally; and spring means connected to the massive body tending to hold the same in the vertical plane of the wing and to return the body to said vertical plane when deflected laterally out of said vertical plane, whereby the massive body will move in one lateral direction due to centrifugal force generated by turning of the vehicle in opposite direction so that the tab turns in said opposite lateral direction, and whereby impingement of wind on the turned tab will turn the wing in said one direction as to apply a lateral force to the wing which opposes the centrifugal force generated by the turning vehicle.

2. An aerodynamic structure as defined by claim 1, wherein the wing is hollow and both the massive body and spring means are located inside the wing.

3. An aerodynamic structure as defined by claim 1, further comprising damper means connected between the wing and tab to inhibit free oscillatory turning movement of the wing while the vehicle is in motion.

4. An aerodynamic structure as defined by claim 3, wherein the wing is hollow and wherein the massive body, spring means and damper means are located inside the wings.

5. An aerodynamic structure as defined by claim 1, wherein the wing has a streamlined rounded leading end, vertical faired side walls, and tapered narrow trailing end, and wherein the tab is generally triangular in horizontal cross section with rectangular vertical side walls.

6. An aerodynamic structure as defined by claim 5, wherein the wing is hollow and both the massive body and spring means are located inside the wing.

7. An aerodynamic structure as defined by claim 5, further comprising damper means connected between the wing and tab to inhibit free oscillatory turning movements of the wing while the vehicle is in motion.

8. An aerodynamic structure as defined by claim 7, wherein the wing is hollow and wherein the massive body, spring means and damper means are located inside the wing.

9. An aerodynamic structure as defined by claim 8, wherein the shaft means extends below the wing with its axis passing through the center of gravity of the wing, so that the shaft means can support the wing above the center of gravityl of the vehicle and axially aligned with the center of gravity of the vehicle.

References Cited
UNITED STATES PATENTS
3,326,318  6/1967  De Bevoise.

PHILIP GOODMAN, Primary Examiner